US011868073B2

(12) United States Patent
Sasaki et al.

(10) Patent No.: US 11,868,073 B2
(45) Date of Patent: Jan. 9, 2024

(54) IMAGE FORMING SYSTEM HAVING IMAGE FORMING APPARATUS AND POST-PROCESSING APPARATUS

(71) Applicants: Kei Sasaki, Kanagawa (JP); Kazuki Seto, Kanagawa (JP)

(72) Inventors: Kei Sasaki, Kanagawa (JP); Kazuki Seto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 6 days.

(21) Appl. No.: 17/715,956

(22) Filed: Apr. 8, 2022

(65) Prior Publication Data

US 2022/0334525 A1 Oct. 20, 2022

(30) Foreign Application Priority Data

Apr. 14, 2021 (JP) ................................ 2021-068445

(51) Int. Cl.
*G03G 15/00* (2006.01)

(52) U.S. Cl.
CPC ................................ *G03G 15/6541* (2013.01)

(58) Field of Classification Search
CPC ..... G03G 15/6541; G03G 2215/00835; G03G 15/6544; B65H 1/00
See application file for complete search history.

(56) References Cited

U.S. PATENT DOCUMENTS 6,035,166 A * 3/2000 Furukawa ............ G03G 15/102 399/239
6,394,728 B1 * 5/2002 Boss ..................... B42C 9/0081 412/1
2014/0072388 A1 * 3/2014 Hashimoto ........ G03G 15/6544 412/1
2014/0227064 A1 * 8/2014 Matsue ................. B42C 13/003 412/37
2017/0220914 A1 * 8/2017 Kondo ............... G03G 15/6544

FOREIGN PATENT DOCUMENTS

| | | |
|---|---|---|
| JP | 2014-201432 | 10/2014 |
| JP | 2015-127116 | 7/2015 |
| JP | 2015-166281 | 9/2015 |
| JP | 2018-199552 | 12/2018 |
| JP | 2018-199553 | 12/2018 |
| JP | 2019-137519 | 8/2019 |

* cited by examiner

*Primary Examiner* — Walter L Lindsay, Jr.
*Assistant Examiner* — Milton Gonzalez
(74) *Attorney, Agent, or Firm* — XSENSUS LLP

(57) ABSTRACT

An image forming apparatus is to supply paper sheets on which images are formed to a post-processing apparatus to pressure-bind binding areas of paper sheets bundled. The image forming apparatus includes a conveyor, an image forming device, and a controller. The conveyor conveys a paper sheet. The image forming device discharges liquid ink to the paper sheet conveyed by the conveyor. The controller repeatedly executes a process of: causing the conveyor to convey the paper sheet to a position facing the image forming device; causing the image forming device to discharge the liquid ink to form an image on the paper sheet; and causing the conveyor to convey the paper sheet on which the image has been formed toward the post-processing apparatus. The controller further causes the image forming device to apply the liquid ink to a binding area of at least one of the paper sheets.

19 Claims, 12 Drawing Sheets

| MODEL NUMBER | CONVEYANCE DISTANCE |
|---|---|
| AAA | $L_1$ |
| BBB | $L_2$ |
| CCC | $L_3$ |

| PAPER TYPE | SHEET THICKNESS |
|---|---|
| THIN PAPER | $T_1$ |
| MEDIUM-THICKNESS PAPER | $T_2$ |
| THICK PAPER | $T_3$ |

IMAGE FORMING SYSTEM HAVING IMAGE FORMING APPARATUS AND POST-PROCESSING APPARATUS

CROSS-REFERENCE TO RELATED APPLICATION

This patent application is based on and claims priority pursuant to 35 U.S.C. § 119(a) to Japanese Patent Application No. 2021-068445, filed on Apr. 14, 2021, in the Japan Patent Office, the entire disclosure of which is hereby incorporated by reference herein.

BACKGROUND

Technical Field

Embodiments of the present disclosure relate to an image forming apparatus and an image forming system.

Related Art

Conventionally, there has been known a system including an image forming apparatus that forms an image on paper and a post-processing apparatus that binds a plurality of paper sheets on which an image has been formed by the image forming apparatus into a bundle (hereinafter, it is referred to as a "paper bundle"). In recent years, from the viewpoint of resource saving and ecology, there have been increasing in number post-processing apparatuses capable of "pressure-binding" by which to deform and bind a paper bundle under pressure with concavo-convex binding teeth, instead of binding with needles.

The pressure-binding has a problem that, as the number of paper sheets constituting a paper bundle increases, the binding teeth hardly bite into the paper bundle, so that the paper sheets cannot be appropriately bound. There is thus a technique by which to soak a region in paper sheets where the binding teeth are to contact (hereinafter, referred to as a "binding area") with water. In this manner, the hydrogen bonding in the paper sheets is weakened by addition of water before the pressure-binding, whereby the paper sheets can be firmly bound by the pressure-binding.

SUMMARY

According to an embodiment of the present disclosure, there is provided an image forming apparatus to supply a plurality of paper sheets on which an image is formed to a post-processing apparatus to pressure-bind binding areas of a plurality of paper sheets bundled. The image forming apparatus includes a conveyor, an image forming device, and a controller. The conveyor conveys a paper sheet. The image forming device discharges liquid ink to the paper sheet conveyed by the conveyor. The controller controls operations of the conveyor and the image forming device. The controller repeatedly executes a process of: causing the conveyor to convey the paper sheet to a position facing the image forming device; causing the image forming device to discharge the liquid ink to form an image on the paper sheet; and causing the conveyor to convey the paper sheet on which the image has been formed toward the post-processing apparatus. The controller further causes the image forming device to apply the liquid ink to a binding area of at least one of the plurality of paper sheets.

According to another embodiment of the present disclosure, an image forming system includes the image forming apparatus and a post-processing apparatus to bundle a plurality of paper sheets supplied from the image forming apparatus and pressure-bind binding areas of the plurality of paper sheets bundled.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
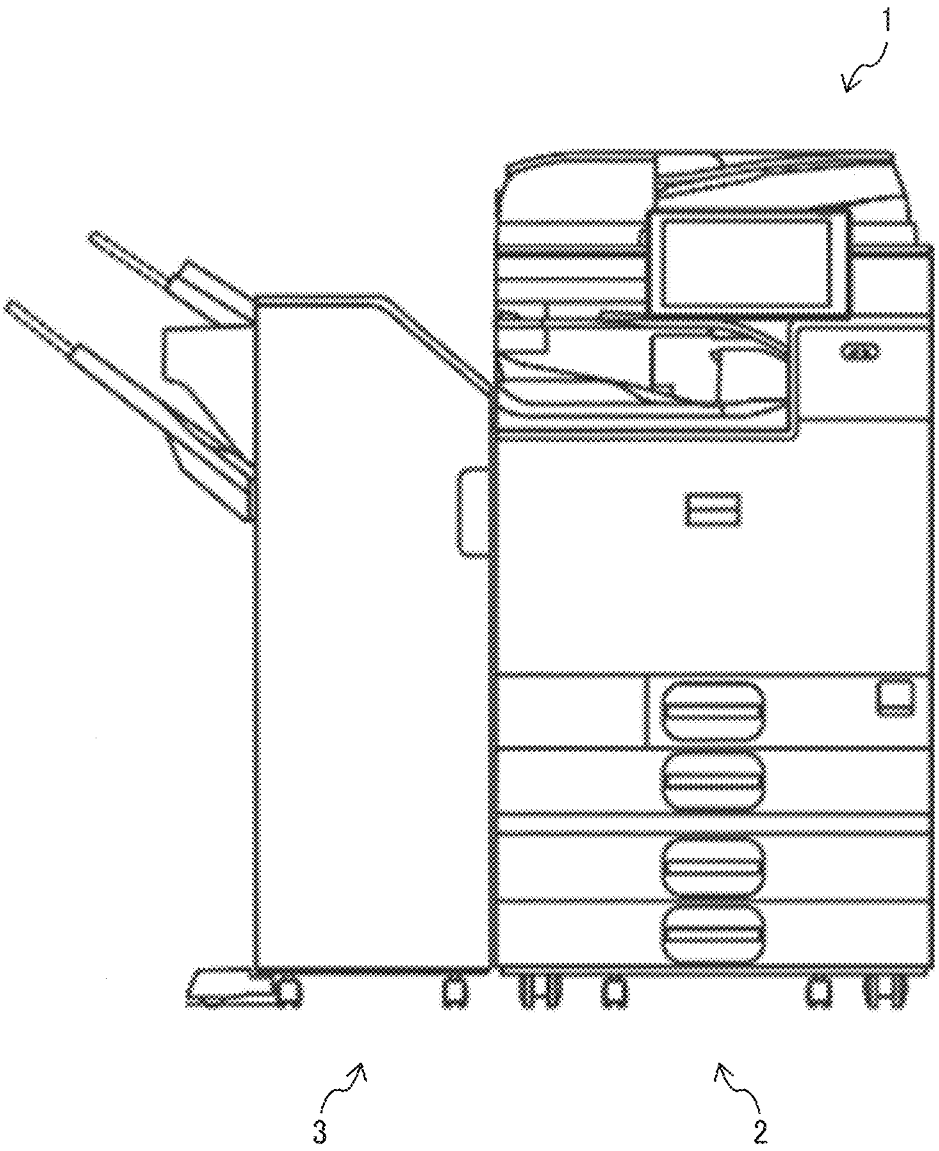
FIG. 1 is a diagram illustrating a general configuration of image forming system.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image forming system 1 according to an embodiment of the present disclosure will be described with reference to the drawings. FIG. 1 is a diagram illustrating a general configuration of an image forming system 1. The image forming system 1 includes a function of forming an image on a plurality of paper sheets and binding the plurality of paper sheets on which the image has been formed into a bundle. As illustrated in FIG. 1, the image forming system 1 includes an image forming apparatus 2 and a post-processing apparatus 3.

Figure 2:
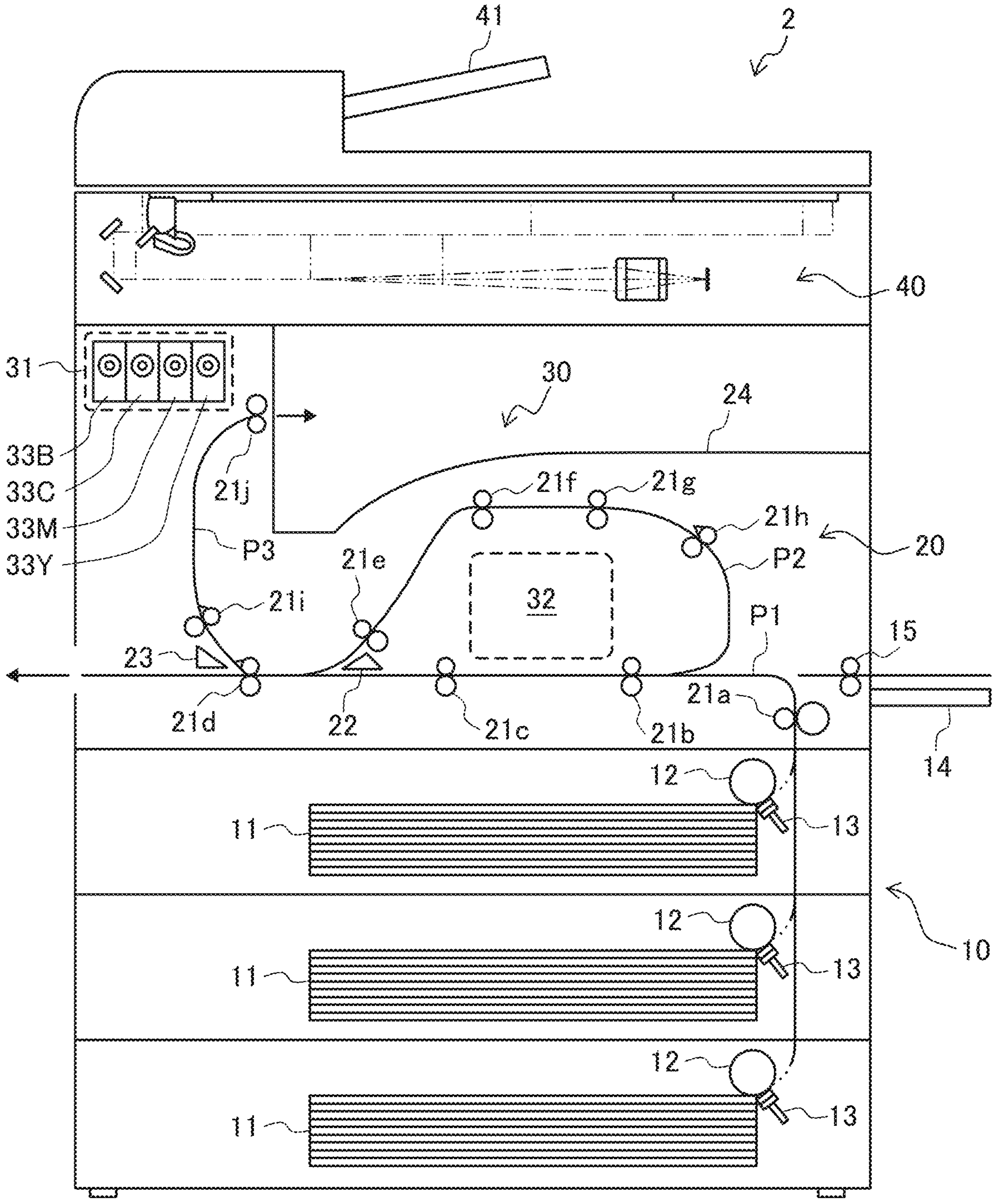
FIG. 2 is a diagram illustrating an internal structure of an image forming apparatus.

FIG. 2 is a diagram illustrating an internal structure of the image forming apparatus 2. The image forming apparatus 2 repeatedly performs a process of forming an image on a paper sheet using liquid ink and ejecting the paper sheet on which the image has been formed to the post-processing apparatus 3. As illustrated in FIG. 2, the image forming apparatus 2 mainly includes a sheet feeder 10, a conveyor 20, and an image forming device 30.

The sheet feeder 10 holds paper sheets before image formation, and feeds the held paper sheets to the conveyor 20. The sheet feeder 10 mainly includes, for example, a sheet tray 11, a separation roller 12, a friction pad 13, a manual feed tray 14, and a pickup roller 15. The image forming apparatus 2 illustrated in FIG. 2 includes a plurality of sets of the sheet tray 11, the separation roller 12, and the friction pad 13, but may include one set. The manual feed tray 14 and the pickup roller 15 may not be provided.

The sheet tray 11 stores a stack of paper sheets before image formation. The separation roller 12 rotates in a state of being in contact with the uppermost paper sheet stored in the sheet tray 11 to send out the paper sheet to the main conveyance path P1. The friction pad 13 separates the paper sheets fed by the separation roller 12 one by one. The manual feed tray 14 supports a paper sheet manually fed by the user of the image forming system 1. The pickup roller 15 nips and rotates the paper sheet supported by the manual feed tray 14 to feed the paper sheet to the main conveyance path P1.

The conveyor 20 conveys the paper sheet fed from the sheet feeder 10. The conveyor 20 includes, for example, a plurality of conveyance roller pairs 21*a* to 21*j* and switching claws 22 and 23. The conveyance roller pairs 21*a* to 21*j* nip and rotate the paper sheet to convey the paper sheet along the conveyance path. The switching claws 22 and 23 are arranged at branch points of the two conveyance paths, and switch between the two conveyance paths to which the paper sheet conveyed by the conveyance roller pairs 21*a* to 21*j* is to be guided.

A main conveyance path P1, a reverse conveyance path P2, and an ejection conveyance path P3 are formed inside the image forming apparatus 2. The main conveyance path P1, the reverse conveyance path P2, and the ejection conveyance path P3 constitute spaces through which paper sheets can pass. The main conveyance path P1 is a path from the sheet tray 11 and the manual feed tray 14 through a position facing the recording head 32 to the post-processing apparatus 3. The reverse conveyance path P2 is a path that branches from the main conveyance path P1 on the downstream side of the sheet conveyance direction of the recording head 32 and joins the main conveyance path P1 on the upstream side of the sheet conveyance direction of the recording head 32. In addition, the reverse conveyance path P2 is a path that reverses the paper sheet having the image recorded on the front surface and guides the paper sheet to a position facing the recording head 32 again. The ejection conveyance path P3 is a path that branches from the main conveyance path P1 on the downstream side of the sheet conveyance direction of the recording head 32 and reaches an output tray 24.

The conveyance roller pairs 21*a* to 21*d* are arranged on the main conveyance path P1 at predetermined spacings provided in the conveyance direction. The conveyance roller pairs 21*e* to 21*h* are arranged on the reverse conveyance path P2 at predetermined spacings provided in the conveyance direction. The conveyance roller pairs 21*i* to 21*j* are arranged on the ejection conveyance path P3 at predetermined spacings provided in the conveyance direction. That is, the paper sheet is conveyed along the main conveyance path P1 by the conveyance roller pairs 21*a* to 21*d*, conveyed along the reverse conveyance path P2 by the conveyance roller pairs 21*e* to 21*h*, and conveyed along the ejection conveyance path P3 by the conveyance roller pairs 21*i* to 21*j*.

The switching claw 22 is arranged at a branch point between the main conveyance path P1 and the reverse conveyance path P2. The switching claw 22 switches between guiding and not guiding the paper sheet conveyed along the main conveyance path P1, toward the reverse conveyance path P2. The switching claw 23 is arranged at a branch point between the main conveyance path P1 and the ejection conveyance path P3. Then, the switching claw 23 switches between guiding and not guiding the paper sheet conveyed along the main conveyance path P1, toward the ejection conveyance path P3.

The image forming device 30 adopts an ink jet method of forming an image on a paper sheet conveyed on the main conveyance path P1 by ejecting liquid ink toward the paper sheet. The image forming device 30 can combine liquid ink of a plurality of colors (for example, black, cyan, magenta, and yellow) to form a color image. Furthermore, the liquid ink is, for example, dye ink or pigment ink. The image forming device 30 mainly includes, for example, a cartridge holder 31 and the recording head 32.

Ink cartridges 33B, 33C, 33M, and 33Y containing liquid ink of different colors are independently attached to and detached from the cartridge holder 31. The cartridge holder 31 supplies the liquid ink of the four colors from the mounted ink cartridges 33B, 33C, 33M, and 33Y to the recording head 32. The recording head 32 includes a plurality of nozzles that discharges the liquid ink of the corresponding colors supplied from the cartridge holder 31. That is, the nozzles are formed on a surface of the recording head 32 facing the main conveyance path P1. The colors of the ink may include white, gold, silver, and the like in addition to black, cyan, magenta, and yellow.

That is, the liquid ink stored in the ink cartridges 33B, 33C, 33M, and 33Y is gradually reduced by being discharged from the recording head 32. Therefore, the image forming device 30 includes remaining amount sensors 34B, 34C, 34M, and 34Y (see FIG. 5). The remaining amount sensors 34B, 34C, 34M, and 34Y detect the remaining amounts of the liquid ink (hereinafter, referred to as "remaining ink amounts") stored in the corresponding ink cartridges 33B, 33C, 33M, and 33Y mounted in the cartridge holder 31, and output remaining amount signals indicating the detected remaining ink amounts to the controller 100 (see FIG. 5). The remaining amount sensors 34B, 34C, 34M, and 34Y are implemented by, for example, known optical sensors.

The image forming apparatus 2 may further include a reader 40. The reader 40 reads an image recorded on a document and generates image data indicating the read image. The reader 40 reads an image by a charge coupled device (CCD) or the like. The reader 40 may include an auto document feeder (ADF) 41 that causes the CCD to sequentially read a plurality of documents.

Figure 3:
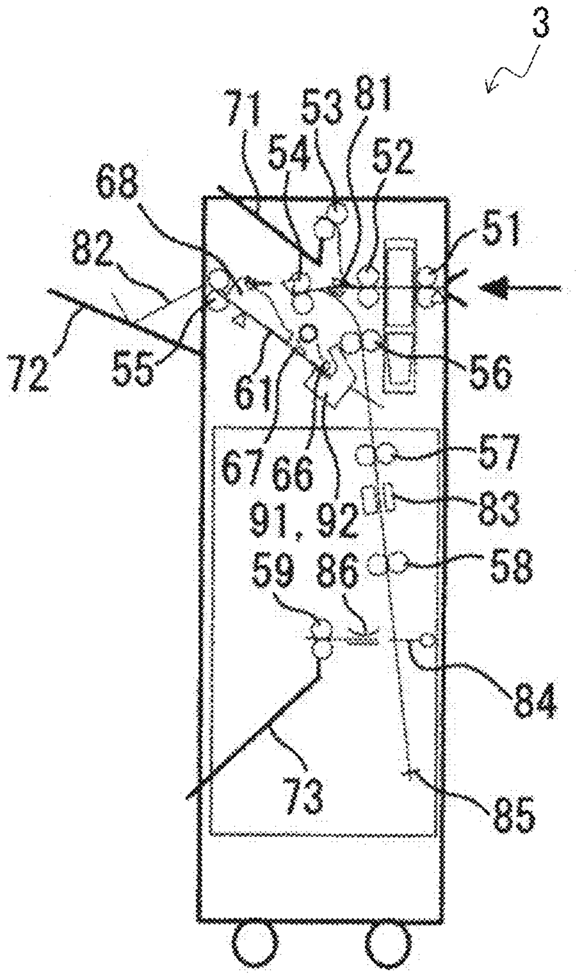
FIG. 3 is a diagram illustrating an internal structure of a post-processing apparatus.

FIG. 3 is a diagram illustrating the internal structure of the post-processing apparatus 3. The post-processing apparatus 3 performs post-processing on paper sheets on which images have been formed by the image forming apparatus 2. The post-processing apparatus 3 according to the present embodiment performs a "pressure-bonding" process of binding bundle of paper sheets (hereinafter, referred to as a "paper bundle") on which images have been formed by pressure-deforming the bundle without using a needle. The post-processing apparatus 3 mainly includes, for example, conveyance roller pairs 51 to 55, an internal tray 61, discharge trays 71 and 72, a bifurcating claw 81, and binding processors 91 and 92.

The conveyance roller pairs 51 to 55 convey the paper sheets supplied from the image forming apparatus 2 inside the post-processing apparatus 3. The internal tray 61 temporarily supports a paper bundle to be subjected to post-processing. The discharge tray 71 supports paper sheets that are not subjected to post-processing. The discharge tray 72 supports the paper bundle having undergone the post-processing. The bifurcating claw 81 switches between the internal tray 61 and the discharge tray 71 to either of which the paper sheets having been conveyed by the conveyance roller pairs 51 to 52 are to be guided. More specifically, the bifurcating claw 81 guides the paper sheets to be subjected to post-processing to the internal tray 61, and guides the paper sheets not to be subjected to post-processing to the discharge tray 71.

The position of the paper bundle supported by the internal tray 61 is aligned by an end fence 66 in the conveyance direction, and is aligned by a side fence 68 in the width direction orthogonal to the conveyance direction. Then, the binding processors 91 and 92 pressurize and bind the paper bundle aligned by the end fence 66 and the side fence 68.

Figure 4A:
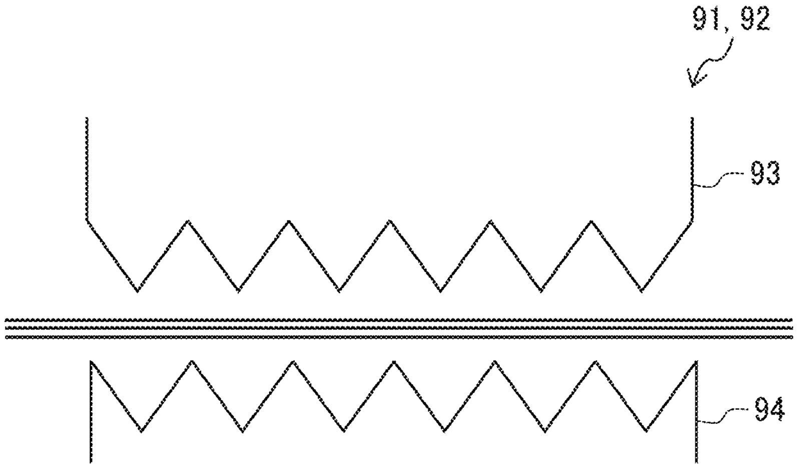
FIGS. 4A and 4B are schematic diagrams illustrating a configuration of a binding processor.
Figure 4B:

FIGS. 4A and 4B are schematic diagrams illustrating a configuration of the binding processors 91 and 92. As illustrated in FIGS. 4A and 4B, each of the binding processors 91 and 92 includes a first member 93 and a second member 94. The first member 93 and the second member 94 are arranged to face each other in the thickness direction of the paper bundle with the paper bundle supported by the internal tray 61 interposed therebetween. Concavo-convex binding teeth in which recesses and projections are alternated are formed on surfaces of the first member 93 and the second member 94 facing each other. The binding teeth of the first member 93 and the second member 94 are formed such that the recesses and the projections are shifted so as to mesh with each other.

In the process of supplying the plurality of paper sheets constituting the paper bundle to the internal tray 61, the first member 93 and the second member 94 are separated from each other as illustrated in FIG. 4A. Then, when all the paper sheets constituting the paper bundle are supported by the internal tray 61, the binding teeth of the first member and the second member 94 mesh with each other as illustrated in FIG. 4B, and the paper bundle is pressurized and deformed from the thickness direction. Accordingly, the paper bundle supported by the internal tray 61 is pressure-bound. The pressure-bound paper bundle is discharged to the discharge tray 72 by the discharge claw 67 and the conveyance roller pair 55. The amount of the paper bundle supported by the discharge tray 72 is detected by a filler 82.

Note that an area of each paper sheet that is pressurized and deformed by the first member 93 and the second member 94 is defined as a "binding area". That is, the binding area is an area of the paper sheet corresponding to the shape and size of the binding teeth of the first member 93 and the second member 94. The binding area is present on the front and back surfaces of the paper sheet. The binding area is, for example, a rectangle having long and short sides.

The binding processors 91 and 92 are arranged apart from each other in the width direction of the paper bundle. In addition, the binding processors 91 and 92 may be configured to move along the outer edge of the paper bundle supported by the internal tray 61 or to be changeable in the angle. That is, the post-processing apparatus 3 may be capable of performing pressure-binding of one or more binding areas of the paper bundle supported by the internal tray 61.

Further, the post-processing apparatus 3 may be capable of performing "saddle-stitching process" of binding the center of the paper bundle. For this case, the post-processing apparatus 3 further includes conveyance roller pairs 56 to 59, a discharge tray 73, a saddle-stitching processor 83, a paper folding blade 84, a stopper 85, and a paper folding plate 86.

The plurality of paper sheets conveyed by the conveyance roller pairs 56 to 58 is bound at the central portion by the saddle-stitching processor 83. The paper bundle bound at the central portion is further conveyed by the conveyance roller pairs 56 to 58 until the leading end abuts on the stopper 85. The paper bundle having abutted on the stopper 85 is folded in half by the paper folding blade 84 and the paper folding plate 86, and is discharged to the discharge tray 73 by the conveyance roller pair 59.

Figure 5:
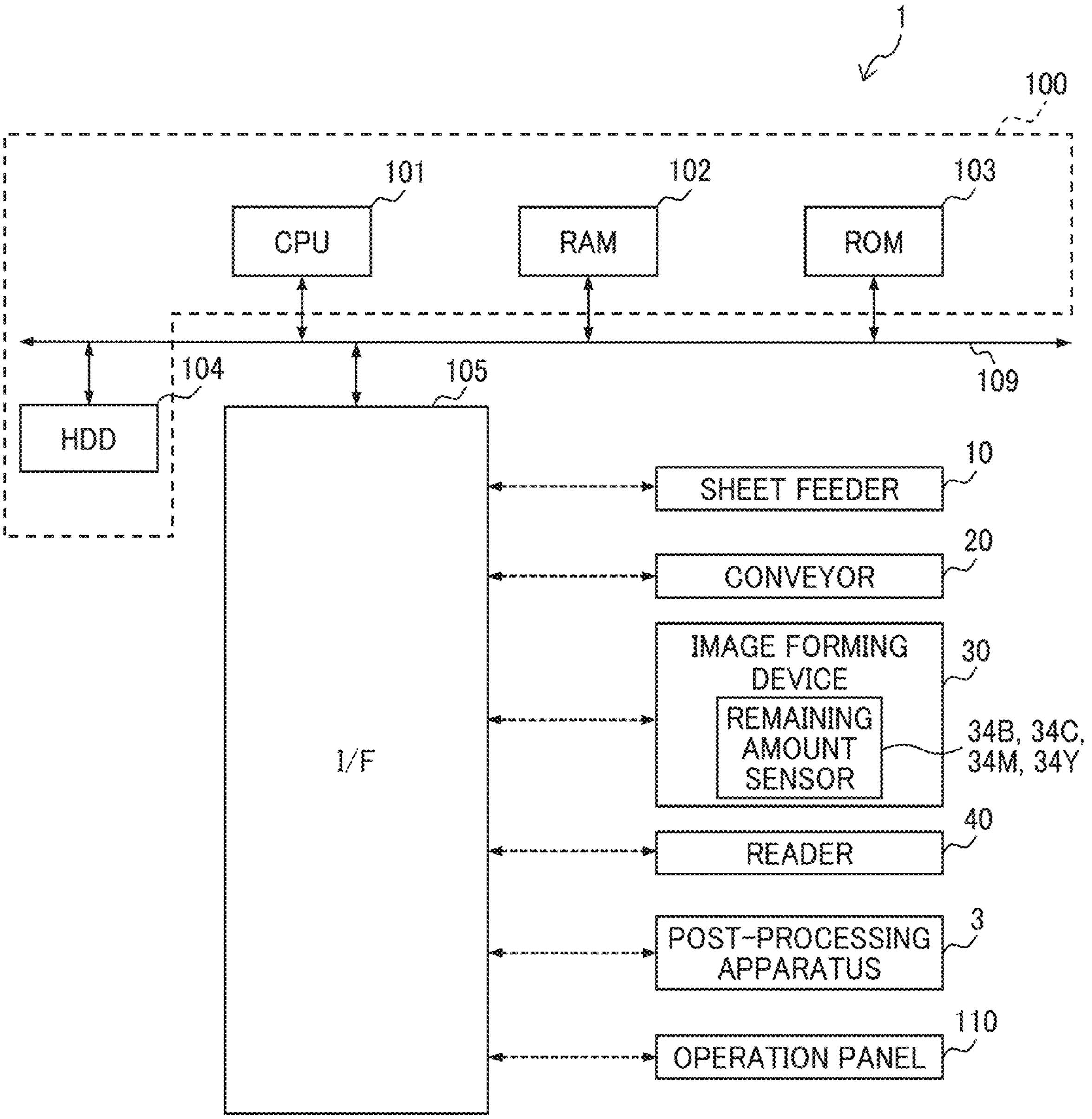
FIG. 5 is a hardware configuration diagram of the image forming system.

FIG. 5 is a hardware configuration diagram of the image forming system 1. As illustrated in FIG. 5, the image forming system 1 has a configuration in which a central processing unit (CPU) 101, a random access memory (RAM) 102, a read only memory (ROM) 103, a hard disk drive (HDD) 104, and an I/F 105 are connected via a common bus 109.

The CPU 101 is a calculation unit and controls the entire operation of the image forming system 1. The RAM 102 is a volatile storage medium that allows data to be read and written at high speed. The CPU 101 uses the RAM 102 as a work area for data processing. The ROM 103 is a read-only nonvolatile storage medium, and stores programs such as firmware. The HDD 104 is a nonvolatile storage medium capable of reading and writing information and having a large storage capacity, and stores an operating system (OS), various control programs, application programs, and the like.

The image forming system 1 processes control programs stored in the ROM 103 and information processing programs (application programs) loaded into the RAM 102 from a storage medium such as the HDD 104, by an arithmetic function provided in the CPU 101. The processing constitutes software control units including various functional modules of the image forming system 1. A combination of the software controller configured as described above and hardware resources installed in the image forming system 1 constitutes functional blocks that implement the functions of the image forming system 1. That is, the CPU 101, the RAM 102, the ROM 103, and the HDD 104 constitute a controller 100 that controls the operation of the image forming system 1.

The I/F 105 is an interface that connects the sheet feeder 10, the conveyor 20, the image forming device 30, the reader 40, the post-processing apparatus 3, and an operation panel 110 to the common bus 109. The controller 100 controls the sheet feeder 10, the conveyor 20, and the image forming device 30 through the I/F 105 to form an image indicated by image data on a paper sheet. In addition, the controller 100 controls the post-processing apparatus 3 to bundle and pressure-bind the plurality of paper sheets supplied from the image forming apparatus 2.

FIG. 5 illustrates an example in which the image forming apparatus 2 and the post-processing apparatus 3 are controlled by the common controller 100. However, a controller that controls the image forming apparatus 2 and a controller that controls the post-processing apparatus 3 may be provided independently and operate in cooperation with each other.

The operation panel 110 includes an operation device that receives an operation from the user and a display that provides information to the user. The operation device includes, for example, hard keys, a touch panel superimposed on the display, and the like. The operation panel 110 acquires information from the user through the operation device and provides information to the user through the display.

Figure 6A:
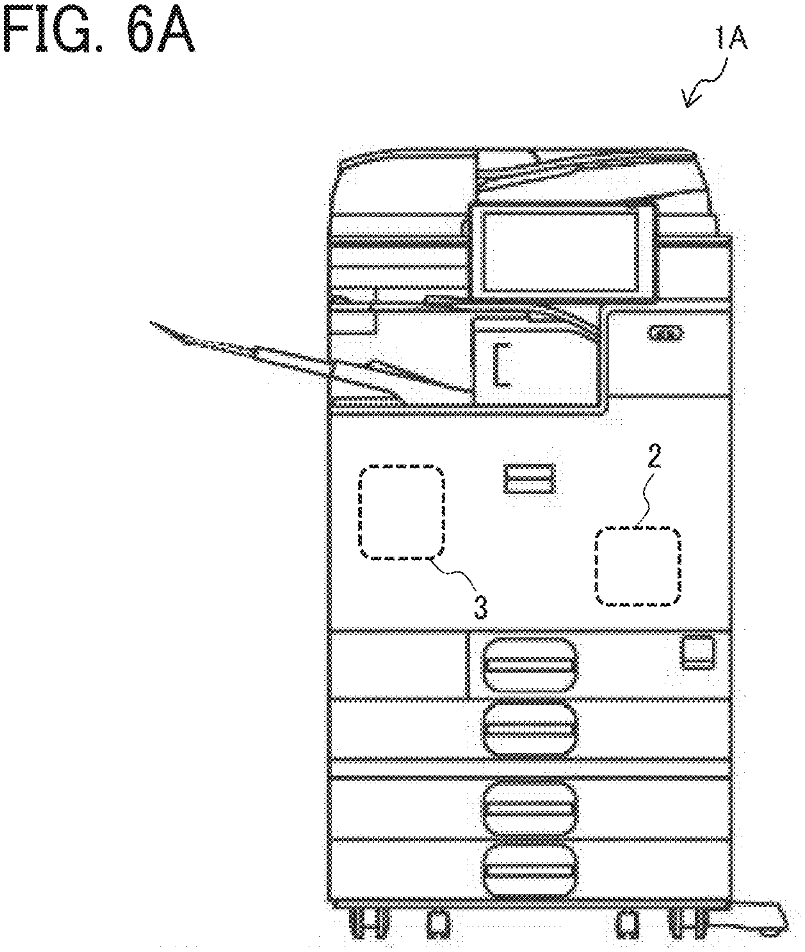
FIGS. 6A and 6B are diagrams illustrating variations of a specific structure of the image forming system.
Figure 6B:
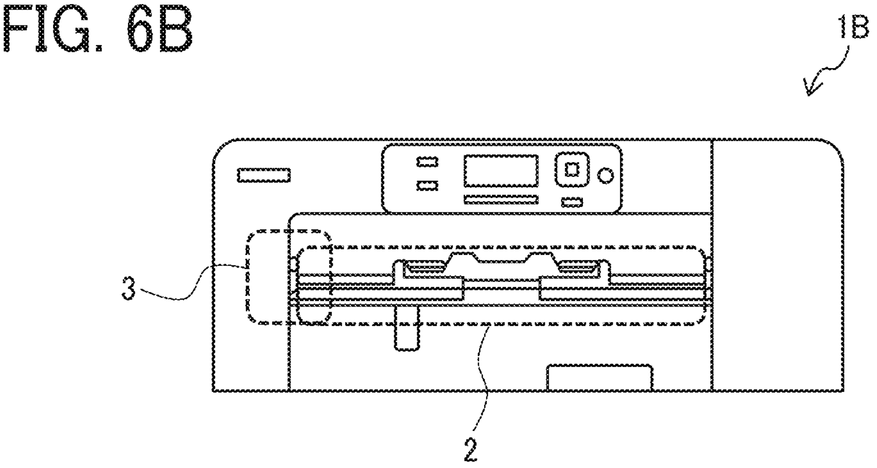

FIGS. 6A and 6B are diagrams illustrating variations in specific structure of the image forming system. The image forming systems 1, 1A, and 1B illustrated in FIGS. 1, 6A, and 6B are common in that the image forming apparatus 2 and the post-processing apparatus 3 are provided, and are different in the arrangement of the image forming apparatus 2 and the post-processing apparatus 3.

In the image forming system 1 illustrated in FIG. 1, the image forming apparatus 2 and the post-processing apparatus 3 have independent housings. The image forming apparatus 2 and the post-processing apparatus 3 are placed side by side in the lateral direction and connected to each other. On the other hand, in the image forming systems 1A and 1B illustrated in FIGS. 6A and 6B, the image forming apparatus 2 and the post-processing apparatus 3 are housed in a common housing. FIG. 6A illustrates an example of a tower-type housing that is high in the vertical direction, and FIG. 6B illustrates an example of a small housing assumed to be placed on a tabletop.

Therefore, the image forming systems 1, 1A, and 1B have different conveyance distances of paper sheets from the image forming apparatus 2 to the post-processing apparatus 3 (more particularly, from a position facing the image forming device 30 to the internal tray 61). More particularly, the conveyance distance from the position facing the image forming device 30 to the internal tray 61 is L1 far the image forming system 1, L2 for the image forming system 1A, and L3 for the image forming system 1B. Further, a relationship of L1>L2>L3 holds.

Figures 7A, 7B, 8:
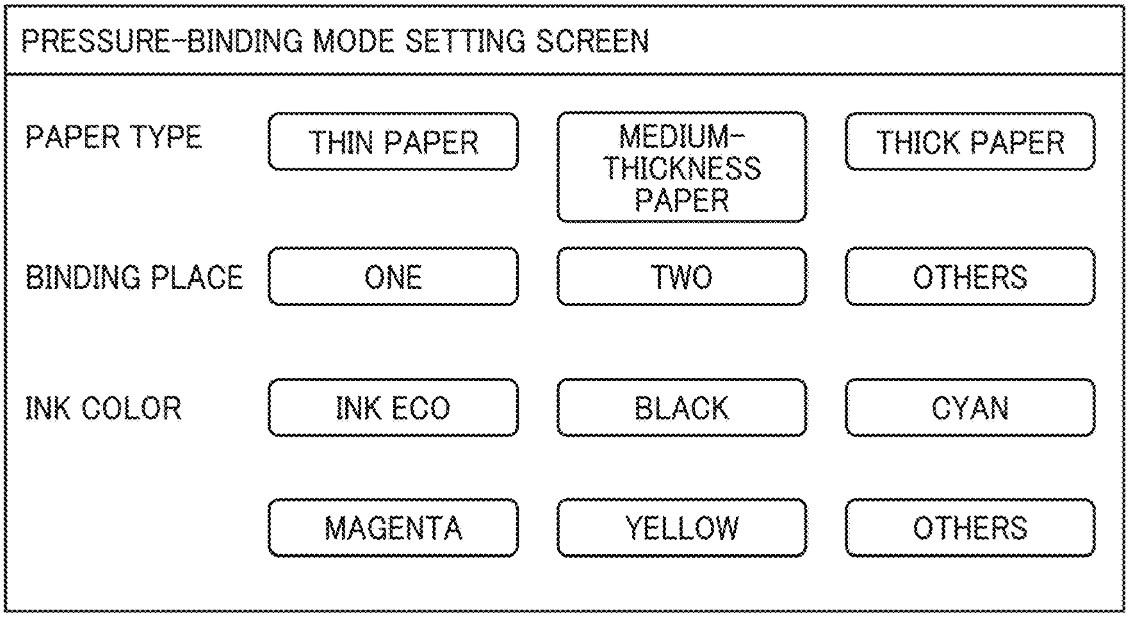
FIGS. 7A and 7B are examples of data of various tables stored in the HDD.
FIG. 8 is a diagram illustrating a display example of a pressure-binding mode setting screen.

FIGS. 7A and 7B illustrate examples of data in various tables stored in the HDD 104. The HDD 104 stores, for example, a conveyance distance table illustrated in FIG. 7A and a sheet thickness table illustrated in FIG. 7B. The conveyance distance table and the sheet thickness table may be stored in the RAM 102 or the ROM 103 instead of the HDD 104.

As illustrated in FIG. 7A, the conveyance distance table holds the model numbers of the image forming systems 1 and the conveyance distances of the paper sheet from the position facing the image forming device 30 to the internal tray 61 in association with each other. For example, the model number of the image forming system 1 illustrated in FIG. 1 is “AAA”, the model number of the image forming system 1A illustrated in FIG. 6A is “BBB”, and the model number of the image forming system 1B illustrated in FIG. 6B is “CCC”. For example, the controller 100 may read the model numbers of the image forming systems 1, 1A, and 1B from the ROM 103 and read the conveyance distances corresponding to the read model numbers from the conveyance distance table.

As illustrated in FIG. 7B, the sheet thickness table holds paper types, which are types of paper sheet on which an image is to be formed, and sheet thicknesses, which are thicknesses of the paper sheets, in association with each other. For example, a sheet thickness T1 of thin paper, a sheet thickness T2 of medium-thickness paper, and a sheet thickness T3 of thick paper have a relationship of T1<T2<T3. As an example, the controller 100 acquires the paper type from the user through the operation panel 110. As another example, the controller 100 acquires the paper type associated with the sheet tray 11 that is the sheet feeding source. Then, the controller 100 may acquire the sheet thickness corresponding to the acquired paper type from the sheet thickness table.

FIG. 8 illustrates a display example of a pressure-binding mode setting screen. The controller 100 displays the pressure-binding mode setting screen illustrated in FIG. 8 on the display of the operation panel 110. The pressure-binding mode setting screen is a screen that accepts specifications of “paper type” that is the type of paper to be pressure-bound (in other words, the type of paper on which an image is to be formed), “binding place (that is, the binding area)” that is the place of pressure binding in the paper bundle, and “ink color” that is the color of liquid ink to be applied to the binding area. The controller 100 may accept the specifications of the paper type, binding place, and ink color through different screens.

The pressure-binding mode setting screen includes a [thin paper] icon, a [medium-thickness paper] icon, and a [thick sheet] icon as icons for accepting the specification of the paper type. The [thin paper] icon corresponds to pressure-binding a bundle of thin paper. The [medium-thickness paper] icon corresponds to pressure-binding a bundle of medium-thickness paper. The [thick paper] icon corresponds to pressure-binding a bundle of thick paper.

The pressure-binding mode setting screen also includes a [one place] icon, a [two places] icon, and a [others] icon as icons for accepting the specification of the binding place(s). The [one place] icon corresponds to setting one place at the upper left corner of the paper bundle as the binding area. The [two places] icon corresponds to setting two places separated in the width direction of the upper side of the paper bundle as the binding areas. The [others] icon corresponds to allowing the user to specify the binding area in the paper bundle on the display.

The pressure-binding mode setting screen further includes an [ink eco] icon, a [black] icon, a [cyan] icon, a [magenta] icon, a [yellow] icon, and an [others] icon as icons for accepting the specification of color. The [ink eco] icon corresponds to using the liquid ink in the ink cartridge having the largest remaining ink amount among the ink cartridges 33B, 33C, 33M, and 33Y mounted in the cartridge holder 31. The [black] icon, the [cyan] icon, the [magenta] icon, and the [yellow] icon correspond to using the liquid ink of the corresponding color. The [others] icon corresponds to allowing the user to specify a combination of liquid ink of respective colors.

The controller 100 accepts operations of specifying the paper type, the binding place, and the ink color through the operation device. Then, the controller 100 stores the paper type, the binding place, and the ink color specified through the pressure-binding mode setting screen, in the RAM 102. This process is executed prior to a pressure-binding process described later.

Figure 9:
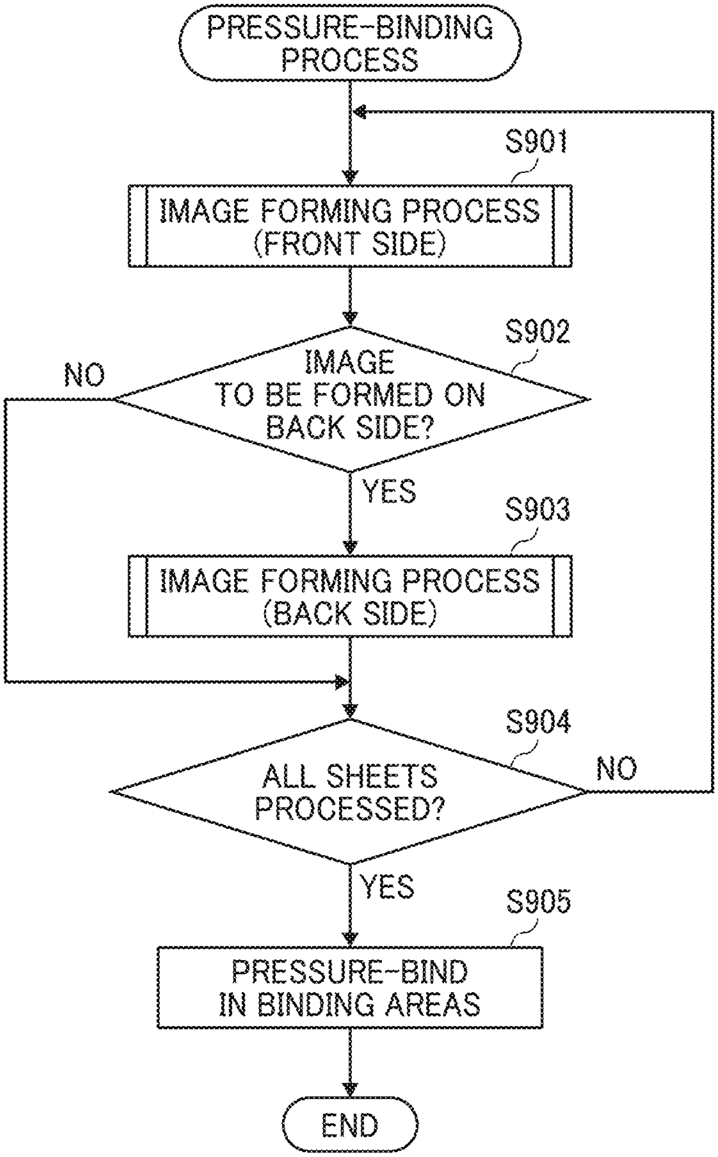
FIG. 9 is a flowchart of a pressure-binding process.

FIG. 9 is a flowchart of the pressure-binding process. The pressure-binding process is a process of causing the post-processing apparatus 3 to pressure-bind a bundle of a plurality of paper sheets on which an image has been formed by the image forming apparatus 2. The controller 100 may receive image data indicating an image to be formed on the plurality of paper sheets from an external device (for example, PC) through a communication interface, or may generate the image data by causing the reader 40 to read a document. The controller 100 prompts the user to specify, through the operation device, whether to form an image only on the front sides of the paper sheets or to form images on the front and back sides of the paper sheets.

First, the controller 100 executes image forming process (front side) to form an image on the front side of each paper sheet (S901). Next, the controller 100 determines whether there is an image to be formed on the back side of the paper sheet (S902). Then, when determining that there is an image to be formed on the back side of the paper sheet (S902: Yes), the controller 100 executes an image forming process (back side) to form the image on the back side of the paper sheet (S903). On the other hand, when determining that there is no image to be formed on the back side of the paper sheet (S902: No), the controller 100 skips step S903.

Next, the controller 100 determines whether the image has been formed on all the paper sheets to be pressure-bound (S904). If determining that some sheet on which the image is to be formed still remains (S904: No), the controller 100 executes step S901 and the subsequent steps again. That is, the controller 100 repeatedly executes steps S901 to S903 to form the image on all the paper sheets to be pressure-bound.

Then, if determining that the image has been formed on all the paper sheets (S904: Yes), the controller 100 causes the post-processing apparatus 3 to execute pressure-binding (S905). That is, the controller 100 moves the binding processors 91 and 92 to the binding position specified through the pressure-binding mode setting screen, and causes the first member 93 and the second member 94 to press and deform the paper bundle supported by the internal tray 61. Further, the controller 100 causes the discharge claw 67 and the conveyance roller pair 55 to discharge the pressure-bound paper bundle to the discharge tray 72.

Figure 10:
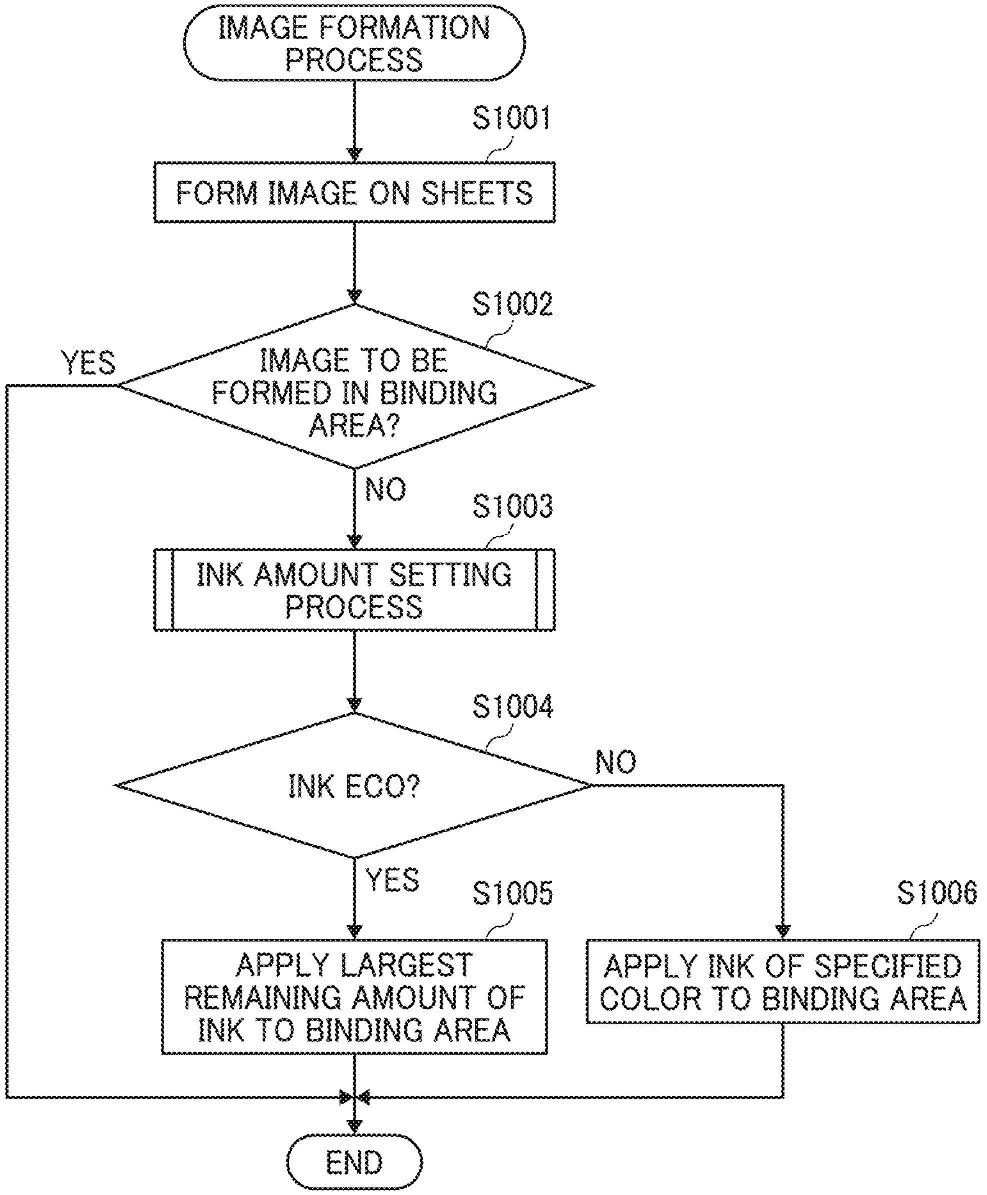
FIG. 10 is a flowchart of an image forming process.

FIG. 10 is a flowchart of the image forming process. The image forming process (front side) and the image forming process (back side) illustrated in FIG. 9 are the same as the process illustrated in FIG. 10, and the operations of the sheet feeder 10 and the conveyor 20 are different. Therefore, first, the image forming process (front side) will be described in detail, and then characteristic steps of the image forming process (back side) will be described.

First, in the image forming process (front side), the controller 100 causes the conveyor 20 to convey the paper sheet fed from the sheet feeder 10 to a position facing the recording head 32. Next, the controller 100 causes the recording head 32 to eject liquid ink toward the facing paper sheet to form an image indicated by the image data on the front side of the sheet (S1001).

Next, the controller 100 determines whether the image formed in step S1001 overlaps the binding area specified through the pressure-binding mode setting screen (S1002). Then, if determining that the image overlaps the binding area (S1002: Yes), the controller 100 skips step S1003 and the subsequent steps. On the other hand, if determining that the image does not overlap the binding area (S1002: No), the controller 100 executes step S1003 and the subsequent steps. That is, the controller 100 executes an ink amount setting process to be described later with reference to FIGS. 11A and 11B.

Next, the controller 100 determines whether the “ink eco” mode is specified through the pressure-binding mode setting screen (S1004). If determining that the “ink eco” mode is specified (S1004: Yes), the controller 100 applies the liquid ink in the ink cartridge having the largest remaining amount among the ink cartridges 33B, 33C, 33M, and 33Y of the respective colors mounted in the cartridge holder 31 to the binding area specified through the pressure-binding mode setting screen (S1005).

More specifically, the controller 100 specifies an ink cartridge having the largest remaining amount of ink based on remaining amount signals output from the remaining amount sensors 34B, 34C, 34M, and 34Y. Then, the controller 100 causes the recording head 32 to eject the ink in the specified ink cartridge toward the binding area.

On the other hand, if determining that the “ink eco” mode is not specified (S1004: No), the controller 100 applies the liquid ink of the color selected or combined through the pressure-binding mode setting screen to the binding area specified through the pressure-binding mode setting screen (S1006). That is, the controller 100 combines one or more of the liquid inks stored in the ink cartridges 33B, 33C, 33M, and 33Y, and causes the recording head 32 to eject the liquid ink toward the binding area. In steps S1005 and S1006, the controller 100 applies the amount of liquid ink set in the ink amount setting process to the binding area.

Next, if determining that there is no image to be formed on the back side of the paper sheet (S902: No), the controller 100 switches to the switching claw 22 such that the paper sheet passes through the main conveyance path P1, and causes the conveyor 20 to convey the paper sheet on which the image is formed toward the post-processing apparatus 3. On the other hand, when determining that there is an image to be formed on the back side of the paper sheet (S902: Yes), the controller 100 switches to the switching claw 22 so that the paper sheet is guided to the reverse conveyance path P2, and causes the conveyor 20 to convey the paper sheet on which the image is formed along the reverse conveyance path P2.

Further, in the image forming process (back side), the controller 100 causes the conveyor 20 to convey the paper sheet, which has been reversed in the reverse conveyance path P2, to a position facing the recording bead 32. Next, the controller 100 executes steps S1001 to S1006 of FIG. 10. Then, the controller 100 switches the switching claw 22 such that the paper sheet passes through the main conveyance path P1, and causes the conveyor 20 to convey the paper sheet on which the image is formed to the post-processing apparatus 3.

Figure 11A:
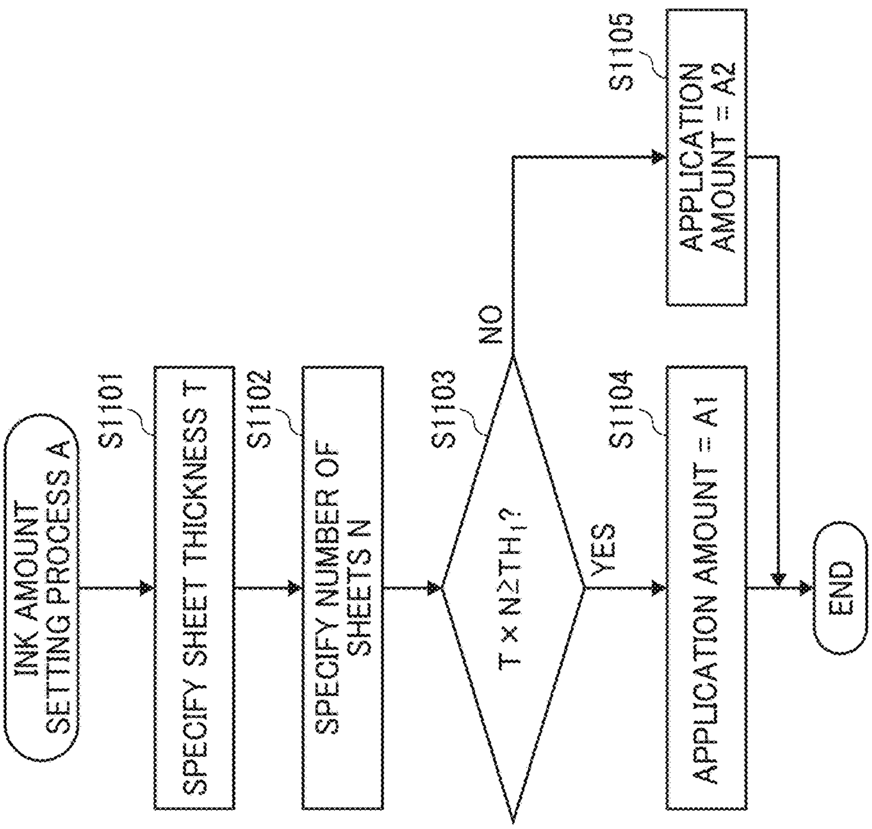
FIGS. 11A and 11B are flowcharts of ink amount setting processes.
Figure 11B:
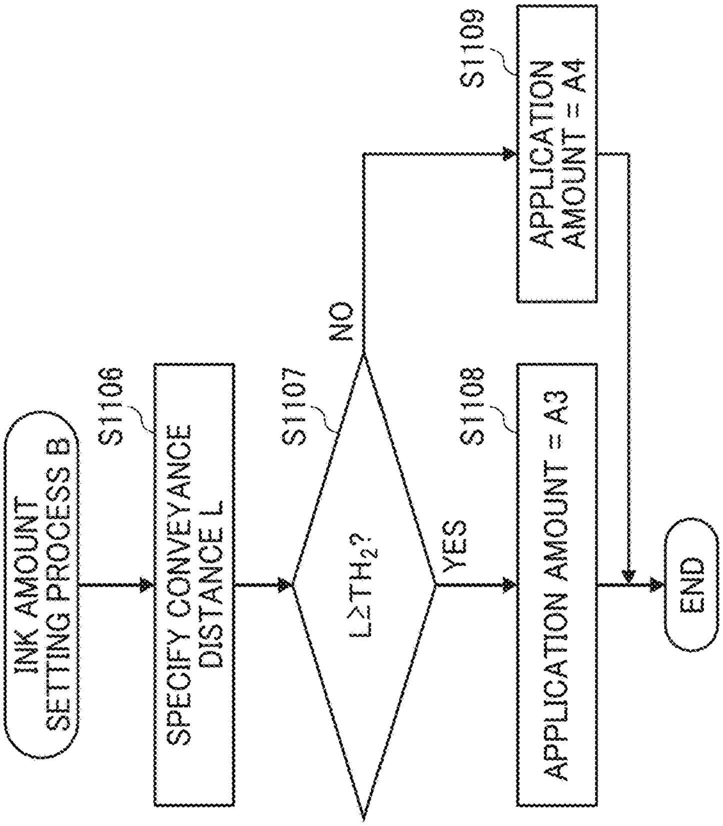

FIGS. 11A and 11B are flowcharts of ink amount setting processes. The ink amount setting process is a process of setting the amount of liquid ink to be applied to the binding area in steps S1005 and S1006 in FIG. 10 (hereinafter, referred to as “application amount”). More particularly, an ink amount setting process A illustrated in FIG. 11A is a process of setting the application amount based on the sheet thickness T of the paper sheet and the number N of paper sheets constituting the paper bundle. In addition, an ink amount setting process B illustrated in FIG. 11B is a process of setting the application amount based on the conveyance distance L. In step S1003 of FIG. 10, the controller 100 executes one or both of the ink amount setting processes A and B.

First, in the ink amount setting process A, the controller 100 specifies the sheet thickness T of the sheets constituting the paper bundle on the basis of the sheet thickness table (S1101). Then, the controller 100 specifies the number N of paper sheets constituting the paper bundle on the basis of the acquired image data (S1102). Then, the controller 100 compares the product (T×N) of the specified sheet thickness T and the number of sheets N with a predetermined first threshold value TH1 (S1103).

Then, if T×N is equal to or larger than the first threshold value TH1 (S1103: Yes), the controller 100 sets the application amount with respect to the binding area to a first amount A1 (S1004). On the other hand, if T×N is less than the first threshold value TH1 (S1103: No), the controller 100 sets the application amount with respect to the binding area to a second amount A2 (S1005). Note that A1>A2. That is, the controller 100 increases the application amount as the sheet thickness T is greater, and increases the application amount as the number N is larger. The controller 100 may increase or decrease the application amount on the basis of only one of the sheet thickness T and the number of sheets N.

In the ink amount setting process B, the controller 100 specifies the conveyance distance L of the paper sheet from the position facing the recording head 32 to the internal tray 61 based on the conveyance distance table (S1106). Then, the controller 100 compares the specified conveyance distance L with a predetermined second threshold value TH2 (S1107).

Then, if the conveyance distance L is equal to or longer than the second threshold value TH2 (S1107: Yes), the controller 100 sets the application amount with respect to the binding area to a third amount A3 (S1008). On the other hand, if the conveyance distance L is less than the second threshold value TH2 (S1107: No), the controller 100 sets the application amount with respect to the binding area to a fourth amount A4 (S1009). Note that A3>A4. That is, the controller 100 increases the application amount as the conveyance distance L is longer.

The controller 100 may adjust the application amount based on the conveyance time of the paper sheet from the position facing the recording head 32 to the internal tray 61 instead of the conveyance distance L. That is, the controller 100 may increase the application amount to the binding area as the conveyance time is longer.

According to the above-described embodiment, the following operational effects are achieved, for example.

According to the above-described embodiment, the liquid ink is applied to the binding area of a paper sheet, using the image forming device 30 that forms an image on the paper sheet. This eliminates the need to separately provide a means for applying water to the binding area, so that the process of adding water to the binding area can be realized with a simple configuration. Furthermore, using the liquid ink having higher viscosity than water makes it possible to suppress liquid ink applied to the binding area from spreading out of the binding area and deteriorating image quality such as smearing of an image.

According to the above-described embodiment, the application amount of the liquid ink to the binding area is adjusted based on the sheet thickness T, the number of sheets N, the conveyance distance L, and the like, so that the pressure-binding can be performed with a desired binding force. Furthermore, adjusting the application amount based on the conveyance time makes it possible to prevent the liquid ink from drying before the pressure-binding is performed.

Furthermore, according to the above-described embodiment, in the case of forming an image only on the front side of the paper sheet, the application of the liquid ink to the binding area on the back side can be omitted to prevent a decrease in throughput. On the other hand, in the case of forming an image on the front side and the back side of the paper sheet, the liquid ink is applied to the binding areas on the front side and the back side, and thus the application amount of the liquid ink to the paper sheet increases to further improve the binding force.

According to the above-described embodiment, the color of the liquid ink applied to the binding area can be changed. Therefore, for example, if the liquid ink of a color close to the ground color of the paper sheet is selected, the liquid ink applied to the binding area becomes inconspicuous after the paper bundle is pressure-bound.

According to the above-described embodiment, adopting the "eco-ink" mode allows a small usage amount of liquid ink (≈a large remaining amount of liquid ink) to be applied to the binding area. This makes it possible to prevent the consumption amount of the liquid ink of a specific color from becoming extremely large, so that the liquid ink can be efficiently used. As a result, the running cost of the image forming systems 1, 1A, and 1B can be reduced.

According to the above-described embodiment, when an image is formed in the binding area, the application of the liquid ink to the binding area is omitted. This makes it possible to prevent the original image from being modified and to prevent a larger amount of ink than the desired application amount from being applied to the binding area. As another example, the controller 100 may perform the determination in step S1002 before forming an image on the paper sheet. If determining that the image will overlap the binding area, the controller 100 may apply the liquid ink to the binding area without forming the image in a predetermined area including the binding area. The controller 100 may further receive a user's operation of switching the control mode for the case where the image will overlap the binding area through the operation device.

According to the above-described embodiment, the user is allowed to specify the positions and number of binding areas before the image is formed on the paper sheet, so that the binding force can be appropriately controlled even in the case of performing pressure-binding in a plurality of binding areas.

Modifications

In the above-described embodiment, as an example, the same amount of liquid ink is applied to the binding areas of all the paper sheets constituting the paper bundle. However, the controller 100 may change the amount of liquid ink applied to each paper sheet. For example, the controller 100 may decrease the application amount to the paper sheet located on both outer sides (that is, the front cover and the back cover) of the paper bundle and may increase the application amount to the paper sheets located inside the paper bundle. This makes it possible to prevent the liquid ink from adhering to the binding processors 91 and 92 and the liquid ink applied to the binding areas from standing out.

In the above-described embodiment, as an example, the liquid ink is applied to the binding areas of all the paper sheets constituting the paper bundle has been described. However, the controller 100 may apply the liquid ink to the binding area of at least one of the plurality of paper sheets constituting the paper bundle. For example, the controller 100 may apply the liquid ink only to the binding area of the paper sheet to be finally supplied to the post-processing apparatus 3.

Figure 12A:
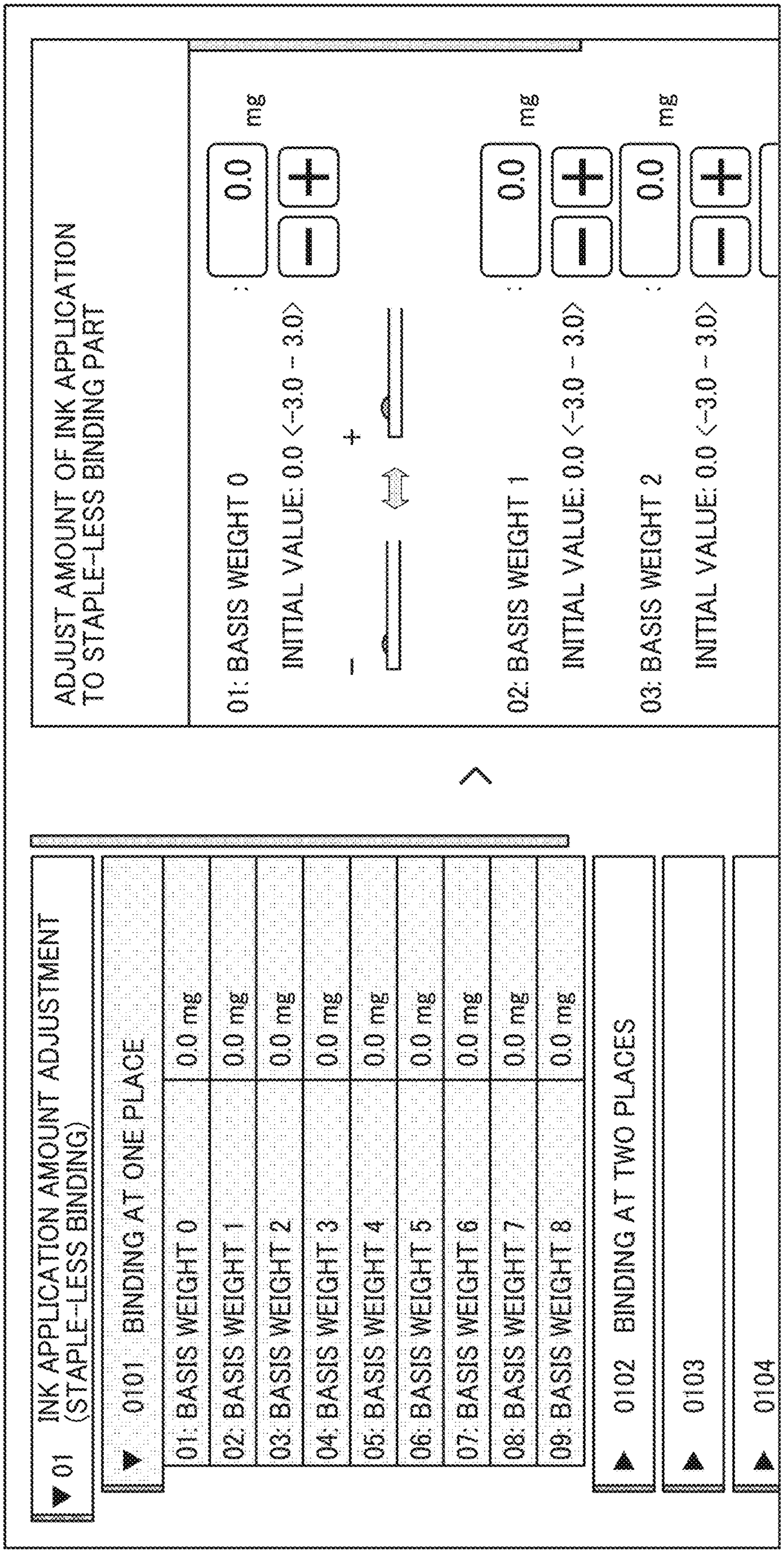
FIGS. 12A and 12B are screen examples on a display.

In the above-described embodiment, as an example, the application amount of the liquid ink to the binding area is adjusted based on parameters such as the sheet thickness T, the number of sheets N, the conveyance distance L, and the conveyance time. However, the application amount of the liquid ink to the binding area may be specified by the user. FIG. 12A is a display example of an ink application amount adjustment screen. The controller 100 causes the display to display the ink application amount adjustment screen illustrated in FIG. 12A. The controller 100 then receives a user's operation of specifying the application amount for each basis weight of the paper sheet through the operation device. The basis weight refers to a weight per unit area [g/m$^2$] of the paper sheet. In steps S1005 and S1006 of FIG. 10, the controller 100 applies the liquid ink to the binding area in the application amount specified in advance through the ink application amount adjustment screen.

Figure 12B:
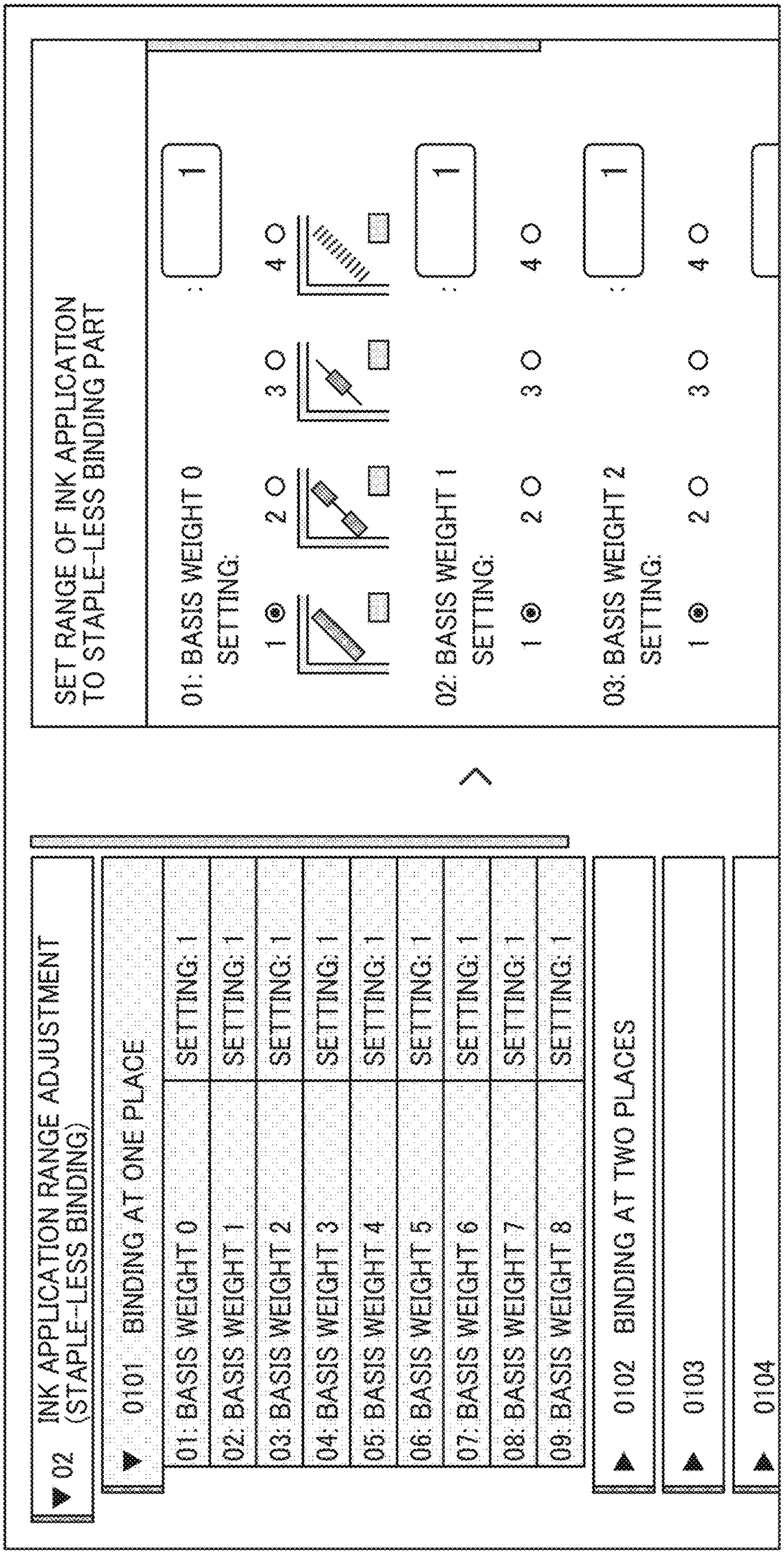

In the above-described embodiment, as an example, the liquid ink is applied to the entire binding area. However, the liquid ink may be selectively applied to a part of the binding area. FIG. 12B is a display example of an ink application range adjustment screen. The controller 100 causes the display to display the ink application range adjustment screen illustrated in FIG. 12B. The controller 100 then receives a user's operation of specifying a range of the binding area to which the liquid ink is to be applied, through the operation device. In the example of FIG. 12B, the user is allowed to select one of four different application range settings. In steps S1005 and S1006 of FIG. 10, the controller 100 applies the liquid ink in the range of the binding area specified in advance through the ink application range adjustment screen.

The setting 1 is a setting of applying the liquid ink to the entire binding area. The setting 2 is a setting of applying the liquid ink only to both ends of the binding area. The setting 3 is a setting of applying the liquid ink only to the central portion of the binding area. The setting 4 is a setting of applying the liquid ink to a plurality of ranges separated in the longitudinal direction of the binding area. Narrowing the range of the binding area to which the liquid ink is to be applied reduces the binding force of the pressure-binding. This makes it easy to release the binding of the paper bundle later.

The control method described above may be realized by, for example, programs or the like. That is, the control method is a method executed by a computer causing an arithmetic device, a storage device, an input device, an output device, and a control device to operate in cooperation on the basis of programs. The programs may be written and distributed in a storage device, a storage medium, or the like, or may be distributed through a telecommunication line or the like.

The present disclosure is not limited to the embodiments exemplified above, and numerous additional modifications and variations are possible without deviating from the technical scope of the present disclosure. All the technical matters included in the technical idea described in the claims are included in the present disclosure. The above-described embodiments are preferred example. Those skilled in the art will be able to practice various modifications from the disclosure. Such modifications are also included in the technical scope of the claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the controller is configured to increase an amount of the liquid ink applied to the binding area as a thickness of the paper sheet increases.

2. The image forming apparatus according to claim 1, wherein the controller is configured to cause the printer to apply the liquid ink to a binding area of each of the plurality of paper sheets.

3. An image forming system comprising:

the image forming apparatus according to claim 1; and a post processor configured to bundle a plurality of paper sheets supplied from the image forming apparatus and pressure-bind binding areas of the plurality of paper sheets bundled.

4. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the controller is configured to increase an amount of the liquid ink applied to the binding area as a number of paper sheets to be pressure-bound increases.

5. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the controller is configured to increase an amount of the liquid ink applied to the binding area as a conveyance distance from the position facing the printer to the post processor is longer or as a conveyance time of the paper sheet from the position facing the printer to the post processor is longer.

6. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the printer is configured to form images on a front side and a back side of the paper sheet, and wherein the controller is configured to:

cause the printer to apply the liquid ink only to the binding area which is on the front side of the paper sheet on which the image is to be formed only on the front side, and cause the printer to apply the liquid ink to binding areas on the front side and the back side of the paper sheet on which the image is to be formed on the front side and the back side.

7. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the printer is configured to discharge the liquid ink which is of a plurality of colors, and wherein the controller is configured to cause the printer to apply the liquid ink of a color selected from the plurality of colors or the liquid ink of a combination of two or more of the plurality of colors to the binding area of the paper sheet.

8. The image forming apparatus according to claim 7, wherein the printer includes:

a cartridge holder to and from which a plurality of ink cartridges containing the liquid ink of the plurality of colors are attachable and detachable;

a recording head configured to discharge the liquid ink from the plurality of ink cartridges mounted in the cartridge holder; and a remaining amount sensor configured to detect a remaining amount of each of the plurality of ink cartridges mounted in the cartridge holder, and wherein the controller is configured to cause the recording head to discharge the liquid ink from an ink cartridge having a largest remaining amount detected by the remaining amount sensor, among the plurality of ink cartridges, toward the binding area of the paper sheet.

9. The image forming apparatus according to claim 7, wherein the controller is configured to cause the printer to apply the liquid ink to a binding area of each of the plurality of paper sheets.

10. An image forming system comprising:

the image forming apparatus according to claim 7; and a post processor configured to bundle a plurality of paper sheets supplied from the image forming apparatus and pressure-bind binding areas of the plurality of paper sheets bundled.

11. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, wherein the controller is configured to omit application of the liquid ink to the binding area when the image formed on the paper sheet overlaps the binding area.

12. The image forming apparatus according to claim 11, wherein the controller is configured to cause the printer to apply the liquid ink to a binding area of each of the plurality of paper sheets.

13. An image forming system comprising:

the image forming apparatus according to claim 11; and a post processor configured to bundle a plurality of paper sheets supplied from the image forming apparatus and pressure-bind binding areas of the plurality of paper sheets bundled.

14. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, the image forming apparatus further comprising:

a user interface to receive an operation of specifying a position of one or more binding areas, wherein the controller is configured to cause the printer to apply the liquid ink to the one or more binding areas specified through the user interface.

15. The image forming apparatus according to claim 14, wherein the controller is configured to cause the printer to apply the liquid ink to a binding area of each of the plurality of paper sheets.

16. An image forming system comprising:

the image forming apparatus according to claim 14; and a post processor configured to bundle a plurality of paper sheets supplied from the image forming apparatus and pressure-bind binding areas of the plurality of paper sheets bundled.

17. An image forming apparatus configured to supply a plurality of paper sheets on which images are formed to a post processor to pressure-bind binding areas of the plurality of paper sheets which are bundled, the image forming apparatus comprising:

a conveyor to convey a paper sheet;

a printer to discharge liquid ink to the paper sheet conveyed by the conveyor; and a controller configured to control operations of the conveyor and the printer, the controller configured to repeatedly execute a process of:

causing the conveyor to convey the paper sheet to a position facing the printer;

causing the printer to discharge the liquid ink to form an image on the paper sheet; and causing the conveyor to convey the paper sheet on which the image has been formed toward the post processor, and the controller configured to further cause the printer to apply the liquid ink to a binding area of at least one of the plurality of paper sheets, the image forming apparatus further comprising:

a user interface configured to receive an operation of specifying a range of the binding area to which the liquid ink is to be applied, wherein the controller is configured to cause the printer to apply the liquid ink to the range of the binding area specified through the user interface.

18. The image forming apparatus according to claim 17, wherein the controller is configured to cause the printer to apply the liquid ink to a binding area of each of the plurality of paper sheets.

19. An image forming system comprising:

the image forming apparatus according to claim 17; and a post processor configured to bundle a plurality of paper sheets supplied from the image forming apparatus and pressure-bind binding areas of the plurality of paper sheets bundled.

* * * * *